Aug. 28, 1923.
E. G. BUTSCH ET AL
1,466,115
FENDER
Filed Nov. 27, 1922
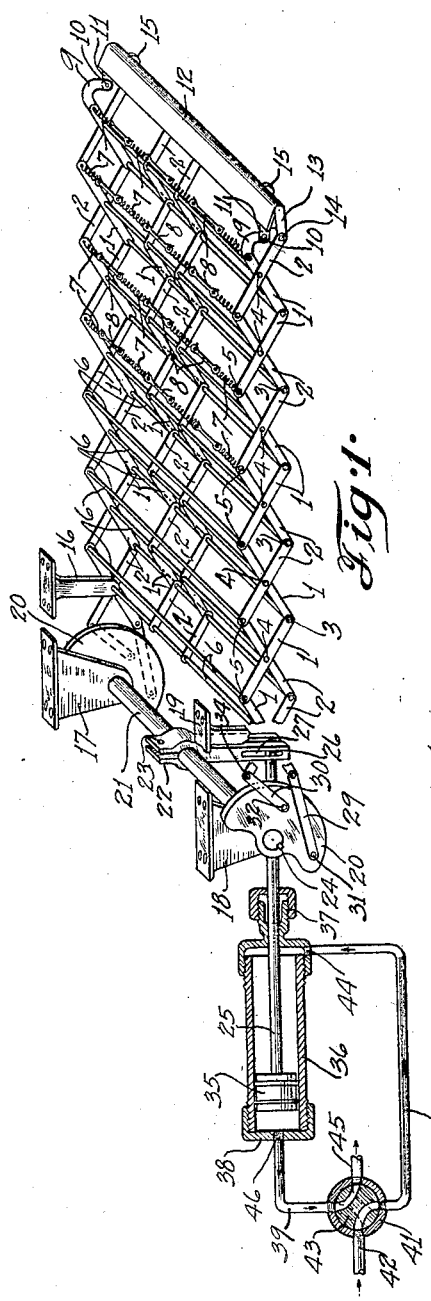
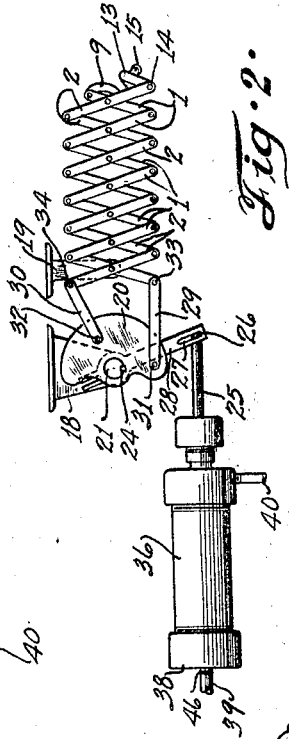
INVENTORS:
Edmund G. Butsch,
George W. Butsch,
BY Hugh R. Wagner
ATTORNEY Patented Aug. 28, 1923.

1,466,115

UNITED STATES PATENT OFFICE.

EDMUND G. BUTSCH, OF ST. LOUIS, MISSOURI, AND GEORGE W. BUTSCH, OF EAST ST. LOUIS, ILLINOIS.

FENDER.

Application filed November 27, 1922. Serial No. 603,498.

*To all whom it may concern:*

Be it known that we, EDMUND G. BUTSCH and GEORGE W. BUTSCH, citizens of the United States, the said EDMUND G. BUTSCH residing at the city of St. Louis, in the State of Missouri, and the said GEORGE W. BUTSCH residing at the city of East St. Louis, in the county of St. Clair and State of Illinois, have invented certain new and useful Improvements in Fenders, of which the following is a specification.

This invention may be attached either to a trolley-car or motor-vehicle or any other kind of vehicle. The mode of attachment is relatively immaterial and may be varied according to the use.

When a moving vehicle unprovided with a fender strikes a person, the person is customarily thrown to the ground and receives a fractured skull, concussion of the brain, or other injuries. When the vehicle is provided with a projecting fender, the person falls toward the vehicle and upon the fender. If the fender is of rigid construction the ankle or leg of the person struck may be broken. It is undesirable for a vehicle to be equipped with a fender that projects at all times, because the fender is in danger of being damaged and, also, takes up space in a procession of traffic and moreover increases the radius of an arc of turning. For these reasons an extensible and more or less flexible fender is preferable.

This fender can be folded into compact form and positively operated by a simple device when necessary to extend the same, it is somewhat yieldable or flexible in every direction, and is provided with a spring-basket.

In the accompanying drawings forming part of this specification, in which like numbers of reference denote like parts wherever they occur, Figure 1 is an isometric view, showing the fender extended; and Figure 2 is a side elevation showing the fender withdrawn and in the position in which it is normally carried.

One of the main features of this fender is the parallel lever construction whereby it can be extended, as shown in Figure 1, and withdrawn to compact form, as shown in Figure 2. The said parallel levers comprise the levers 1 pivoted to the levers 2 at the pivots 3, 4, and 5.

The parallel levers 1 and 2 are in duplicate and located on the opposite sides or edges of the fender, and may be steadied by an intermediate series or plurality of series of the same.

They are cross-connected by the rods 6, which form the pivots 3, 4, and 5.

At the rear of the device there are preferably three of the said rods 6 for each parallel lever 2 (although the number may be varied at will), but in the forward part of the fender springs 7, connected by links 8, are substituted for one of the said rods 6, the pivot point 5 being formed on or at the end of one of the said springs 7.

The most forward levers 1 terminating in hooks 9, to which are pivoted at 10 brackets 11, supporting rail 12. Rail 12 is attached by links 13 to the most forward of the levers 2, being pivoted thereto at 14.

Rollers 15 underlie and are borne by rail 12, so that in the further progress of the vehicle after the fender has been distended the same will not bind on the street or road, but will pass easily thereover on the said rollers 15.

The castings 16, 17, 18, and 19, serve as means for attachment of the device to the vehicle.

Cams 20 are fixed to shaft 21, which is journaled in castings 17 and 18 and, also, held in clip 22, which tightly grips shaft 21 and is thus held by bolt 23. Key 24 prevents rotation of cams 20 on shaft 21.

Piston-rod 25 is attached by pin 26 (adapted to slide in slot 27), to the lower part of clip 22, in which said slot 27 is formed. When piston-rod 25 moves forward to the position shown in Figure 2 it pushes the lower part 28 with it to the position shown in Figure 2, and thereby rocks clip 22 to the position shown in Figure 2, and with it cams 20. When piston-rod 25 is retracted to the position shown in Figure 1, the casting 28 and clip 22 and cams 20 are rocked to the position shown in Figure 1.

By means of the arms 29 and 30, pivoted respectively at 31 and 32 to cams 20 and, also, pivoted respectively at 33 and 34 to the inner end of the series of parallel levers 1 and 2, the aforesaid changes of position of the cams 20 operate alternately to extend and retract the fender composed of the parallel levers 1 and 2, rods 5, links 8, springs 7, and rail 12.

It is immaterial whether the forward thrust of the piston-rod 25 distends or retracts the fender.

The arms 29 and 30 can be so arranged with relation to cams 20 that either movement can be produced by the rocking of the cams 20.

In the drawings an arrangement is depicted whereby when the piston-rod 25 is most withdrawn, relative to the front of the vehicle, the fender is most extended and vice versa. The drawings show, also, that when the piston-rod 25 is most retracted, relative to the front of the vehicle, the piston 35 is most advanced in the cylinder 36.

The cylinder 36 is provided with the usual stuffing-box 37 and packed cylinder-head 38.

Pipes 39 and 40 lead from cylinder 36 to four-way cock 41, opening into cylinder 36 on opposite sides of piston 35.

Pipe 42 leads to a cylinder of compressed air or other source of compressed air. When the valve 43 in four-way cock 41 is in the position shown in Figure 1, the air entering through pipe 42 passes through pipe 40 into port 44 and into cylinder 36 on the side of piston 35 toward the front of the vehicle. This naturally advances piston 35 toward the position shown in Figure 1 and causes the air on the opposite side of piston 35 to exhaust through pipe 39 and outlet 45. When the valve 43 in four-way cock 41 is moved to the dotted line position shown in Figure 1, the air is admitted through pipe 39 into the inside of cylinder 36 through inlet 46 and forces the piston 35 to the opposite end of the cylinder 36 from the position in which it is shown in Figure 1, which rocks cams 20 and retracts the fender to the inoperative position shown in Figure 2.

The initial actuation of the device to distend the fender in the manner shown in Figure 1 is by any suitable means (not shown in the drawings) for movement by either foot or hand of the valve 43 to the position shown in Figure 1, where its openings register with pipes 42 and 40 and outlet 45. The normal position of valve 43 is with its openings, indicated by dotted lines in Figure 1, registering with pipes 39 and 40.

It will be understood, of course, that the width of the fender is greater than the distance measured from the outside of one front wheel to the outside of the other front wheel.

The outer end of the distended fender will naturally sag somewhat and will especially do so under the weight of a person resting thereon.

The springs 7 and links 8 form a resilient basket for the reception of any body thrown or falling thereon. The members 20 are herein called cams, because of the location of the pivotal points 31 and 32 thereon, which give the partial rotation of the members 20 the effect of cams, in their intermittent and unalike movement. Slight changes in the thrust of the fender can be produced by changing the location of the pivotal points 31 and 32 and, also, by lengthening or shortening respectively the arms 29 and 30.

It will be observed that in the drawings arm 30 is shown as shorter than arm 29, which will have the effect in action of causing the distention of the fender to be in a downward direction toward the ground simultaneously with its forward projection.

The forward edge of rail 12 is preferably rounded, so as to inflict as little injury as possible when it strikes a human form, and the same is in pivotal and yielding connection with the forepart of the fender.

While compressed air is herein described as the preferred motive power for operating this fender, other means may be utilized for that purpose.

The shape of the members 20 is immaterial and they may be either full disks or segments, as shown in the drawings, or of any other shape.

Having thus described this invention, we hereby reserve the benefit of all changes in form, arrangement, order, or use of parts, as it is evident that many minor changes may be made therein without departing from the spirit of this invention or the scope of the following claims.

We claim:

1. In a fender adapted to be projected in front of a vehicle or railway car, a bumper element forming a forward contact member of said fender, an extensible framework for connecting said bumper element with the vehicle and for projecting said element forwardly relative to the vehicle, resilient members forming a part of said framework, and means under manual control for extending said framework and moving said bumper element forwardly relative to the vehicle.

2. A support such as a vehicle or railway car, an extensible fender structure having elements pivotally secured to said support, said fender structure comprising a plurality of lazy tongs arranged in parallel relation, a plurality of bars extending transversely of said lazy tongs, each bar constituting a pivotal connecting member for certain of the members of each of the lazy tongs, and manually controlled pneumatic means for extending said lazy tongs.

3. A support such as a vehicle or railway car, an extensible fender structure secured thereto, said fender structure comprising a plurality of lazy tongs arranged in parallel relation, a plurality of bars extending transversely of said lazy tongs, each bar constituting a pivotal connecting member for certain of the members of each of the lazy tongs, a plurality of connecting members including springs related to said lazy tongs in the same manner as are the said bars, and manual controlled pneumatic means for extending said lazy tongs.

4. In a fender structure, a resilient platform adapted to be projected in front of a vehicle or railway car to prevent injury, said platform including a plurality of parallel lazy tongs cross-connected by rigid members and also by spring members, and means for extending and contracting said lazy tongs including a shaft oscillated by pneumatic means.

5. The combination of a cylinder, a piston located therein, air-pipes leading to both sides of the said piston, a piston-rod, a slotted member, a pin connecting the said rod to the said slotted member, a shaft to which the said member is fixed, arms in pivotal connection with the said shaft, and a fender composed of a plurality of parallel levers.

6. The combination of a cylinder, a piston located therein, air-pipes leading to both sides of the said piston, a piston-rod, a slotted member, a pin connecting the said rod to the said slotted member, a shaft to which the said member is fixed, arms in pivotal connection with the said shaft, and a fender composed of a plurality of parallel levers, the said parallel levers being in pivotal connection with each other and cross-connected by rods.

7. The combination of a cylinder, a piston located therein, air-pipes leading to both sides of the said piston, a piston-rod, a slotted member, a pin connecting the said rod to the said slotted member, a shaft to which the said member is fixed, arms in pivotal connection with the said shaft, and a fender composed of a plurality of parallel levers, the said parallel levers being in pivotal connection with each other and cross-connected by rods, and have a spring-basket thereon.

8. The combination of a cylinder, a piston located therein, air-pipes leading to both sides of the said piston, a piston-rod, a slotted member, a pin connecting the said rod to the said slotted member, a shaft to which the said member is fixed, arms in pivotal connection with the said shaft, and a fender composed of a plurality of parallel levers, the said parallel levers being in pivotal connection with each other and cross-connected by rods, and having a spring-basket thereon and a pivoted front bumper.

9. A fender comprising a plurality of parallel levers, the said levers being pivoted together, cross-connections between the said sets of parallel levers forming additional pivotal connections for the same, and means for distending and retracting the same, the said means consisting of a rotatable shaft, journals therefor, borne by the vehicle, means for rotating the said shaft in alternate directions, and arms eccentrically pivoted relative to the said shaft and forming a connection between the same and the said parallel levers.

10. A fender comprising a plurality of parallel levers, the said levers being pivoted together, cross-connections between the said sets of parallel levers forming additional pivotal connections for the same, and means for distending and retracting the same, the said means consisting of a rotatable shaft, journals therefor borne by the vehicle, means for rotating the said shaft in alternate directions, and arms eccentrically pivoted relative to the said shaft and forming a connection between the same and the said parallel levers, one of the said arms being shorter than the other.

11. A fender comprising a plurality of parallel levers, the said levers being pivoted together, cross-connections between the said sets of parallel levers forming additional pivotal connections for the same, and means for distending and retracting the same, the said means consisting of a rotatable shaft, journals therefor borne by the vehicle, means for rotating the said shaft in alternate directions, and arms eccentrically pivoted relative to the said shaft and forming a connection between the same and the said parallel levers, the upper of the said arms being shorter than the other.

12. A fender comprising a plurality of parallel levers, the said levers being pivoted together, cross-connections between the said sets of parallel levers forming additional pivotal connections for the same, and means for distending and retracting the same, the said means consisting of a rotatable shaft, journals therefor borne by the vehicle, means for rotating the said shaft in alternate directions, and arms eccentrically pivoted relative to the said shaft and forming a connection between the same and the said parallel levers, there being one pair of the said arms in connection with each side of the fender.

In testimony whereof we hereunto affix our signatures.

EDMUND G. BUTSCH.
GEORGE W. BUTSCH.